Aug. 3, 1937.　　　　A. C. HOUGLAND　　　　2,089,062
MACHINE AND METHOD FOR CONCENTRATING MOLASSES AND LIKE PRODUCTS
Filed Dec. 30, 1935　　　2 Sheets-Sheet 1
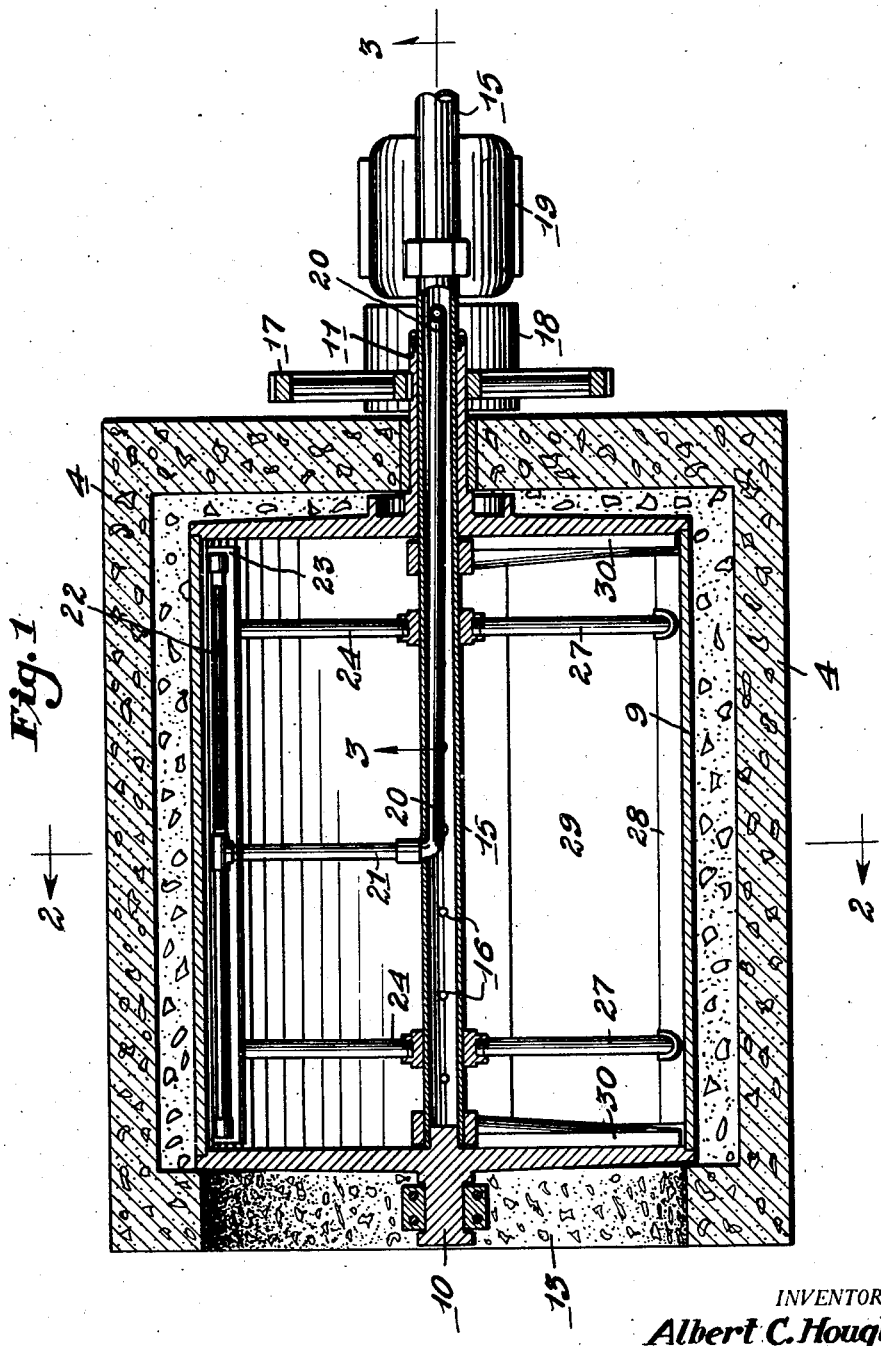
INVENTOR.
Albert C. Hougland
BY
ATTORNEYS Aug. 3, 1937. A. C. HOUGLAND 2,089,062
MACHINE AND METHOD FOR CONCENTRATING MOLASSES AND LIKE PRODUCTS
Filed Dec. 30, 1935 2 Sheets-Sheet 2
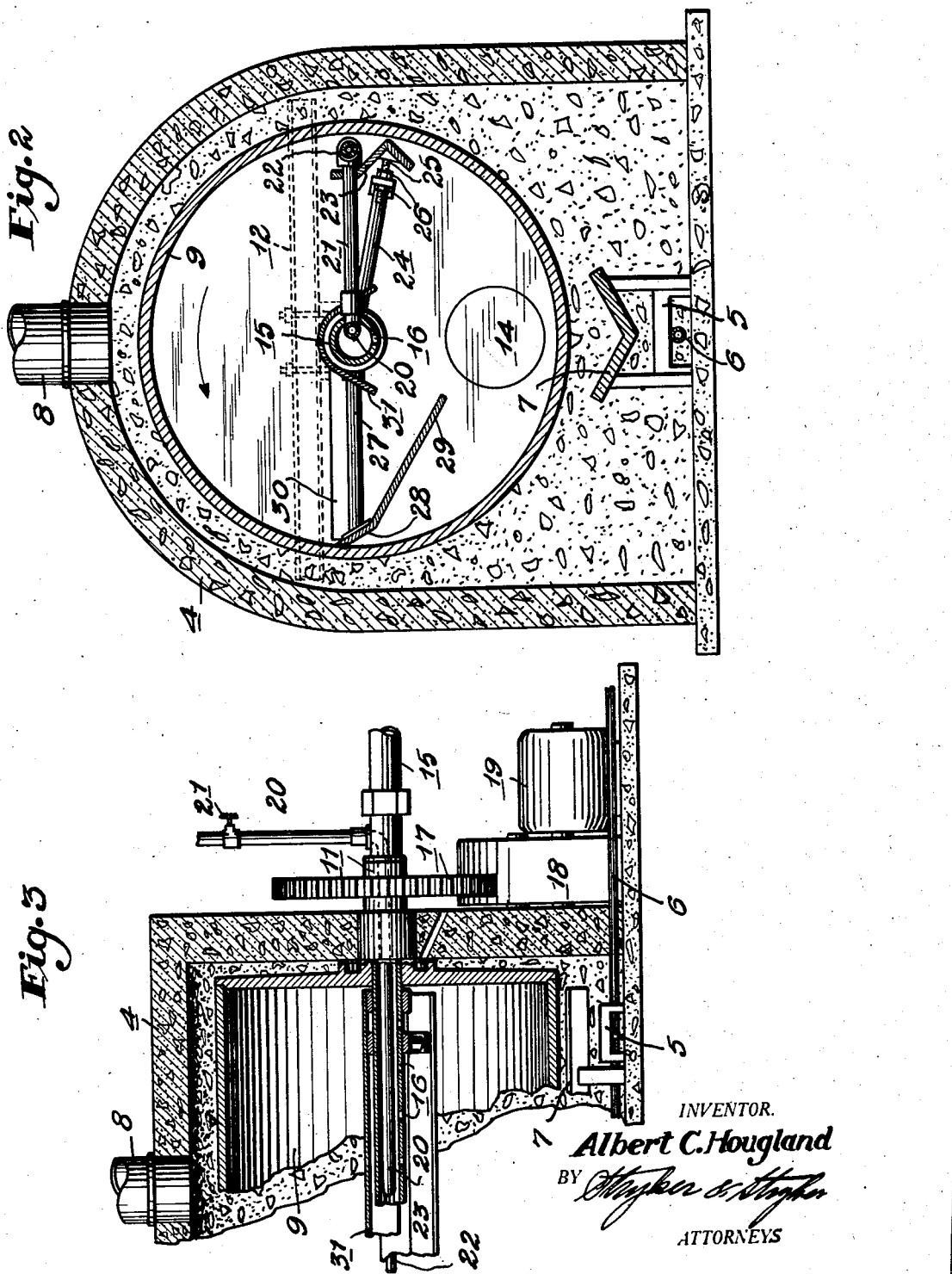
INVENTOR.
Albert C. Hougland
BY
ATTORNEYS Patented Aug. 3, 1937

2,089,062

UNITED STATES PATENT OFFICE 2,089,062

MACHINE AND METHOD FOR CONCENTRATING MOLASSES AND LIKE PRODUCTS

Albert C. Hougland, St. Paul, Minn.

Application December 30, 1935, Serial No. 56,764

7 Claims. (Cl. 159—11)

Molasses, the by-product of the manufacture of sugar, is known to have valuable properties as a feed for livestock but is commonly handled in the liquid form which, when mixed with dry feeds, soon causes fermentation of the mixture or mash. To avoid this, the mash must be prepared immediately before feeding. Liquid molasses is also hard to handle in that it is viscous and gummy. By the present invention I produce economically a solidified or substantially dry molasses which may be mixed with other feeds and is not subject to fermentation. My product has the further advantages of being relatively easy to handle and inexpensive to ship because of its greater concentration as compared to the liquid product.

The object of this invention is to provide a novel process and machine particularly, although not exclusively, adapted for the concentration or solidification of molasses under partial vacuum.

A further object is to provide an economical and practical process and apparatus adapted for large scale production of concentrated molasses and other products requiring heat treatment under greatly reduced pressure conditions.

A particular object is to increase the rate of concentration in a rotary drum concentrator and at the same time eliminate the difficulties attendant upon the foaming and swelling of the product by novel mechanism for distributing the influent liquid on the inner surface of the drum so that the initial and most rapid evaporation is effected while the liquid is spread in a relatively thin film or layer on the upper periphery of the drum and before the product is allowed to collect in a pool or mass of substantial depth.

The invention will be best understood by reference to the accompanying drawings in which—

Figure 1 is a horizontal, central, longitudinal section through my improved machine;

Fig. 2 is a vertical section taken on the line 2—2 of Fig. 1, and

Fig. 3 is a fragmentary vertical section taken on the line 3—3 of Fig. 1.

Referring to the drawings, I provide a large heating chamber 4 in the bottom of which is mounted a series of burners 5 supplied with fuel from a pipe 6. A suitable baffle 7 for the products of combustion is mounted above the burners and communicating with the top of the chamber 4 is a chimney 8. A large cylindrical drum 9 is mounted with its axis disposed horizontally within the chamber 4. At one end the drum 9 has a coaxial shaft 10 projecting therefrom and at the other end a hollow, coaxial shaft 11. The shaft 10 is provided with a journal bearing supported on a horizontal beam 12 (Fig. 2) spanning an opening 13 in the end of the chamber 4. A manhole 14 in an end of the drum is accessible through the opening 13. The shaft 11 has a suitable journal bearing in the opposite end of the chamber 4. Extending axially in the drum and out through the shaft 11 is a large vacuum pipe 15 adapted to be connected to a condenser and pump of the usual or suitable construction. The inner end of the pipe 15 has a suitable journal bearing in the drum 9 and spaced along the pipe are inlet openings 16 communicating with the interior of the drum. Fixed on the shaft 11 is a gear 17 adapted to be driven from a motor 19 through suitable speed-reducing gears in a casing 18.

The molasses or other liquid to be concentrated is admitted to the drum 9 through a pipe 20 under control of a valve 21 (Fig. 3). This pipe 20 enters the drum through the vacuum pipe 15 and has a radially extending portion 21 communicating with distributing branches 22. The branches 22 extend parallel to the axis of the drum and have a multiplicity of outlet openings to distribute the product uniformly on a spreader 23 extending substantially the entire length of the drum, parallel to the axis thereof. As shown in Fig. 2, this spreader is substantially L-shaped in cross section with both legs extending obliquely toward the periphery of the drum. The upper leg directs the influent liquid continuously against the drum while the lower leg confines the more concentrated product, as it is carried up from the bottom on the drum surface, to a thin layer which is covered by the more liquid product as the layer passes the spreader 23. The spreader 23 is mounted on a pair of arms 24 fixed on and supported by the vacuum pipe 15. Screw-threaded studs 25 are fixed on the back of the spreader 23 and are secured to suitable lugs formed on the arms 24 to permit adjustment of the spacing of the spreader from the periphery of the drum. As shown in Fig. 2, lock nuts 26 are threaded on the studs 25 on opposite sides of the lugs formed on the arms 24.

Mounted on arms 27 at the opposite periphery of the drum from the spreader 23 is a scraper 28 adapted to remove the concentrated product from the inner periphery of the drum. An apron 29 is arranged to receive the product from the scraper 28 and to direct it to the lower, central periphery of the drum where the mass of concentrated product is collected. Radially extending scrapers 30 (Figs. 1 and 2) are provided to remove the concentrated product from the end surfaces of the drum so that the product is not allowed to remain in contact with any of the hot surfaces of the drum for a longer time than is required for the latter to make one revolution. To guard against the entry of the product into the intake openings 16 in the vacuum pipe 15, I provide a hood or baffle 31 which projects at opposite sides of the pipe 15, as best shown in Fig. 2.

Operation

In operation the drum 9 is continuously rotated at a suitable low speed in the direction indicated by an arrow in Fig. 2 through the connections, including the gear 17, with the motor 19. A high vacuum is preferably maintained in the drum by continuously exhausting the air and vapors through the pipe 15 having the inlet openings 16. The pipe 15 is stationary and supports the arms 24 and 27 carrying the spreader 23 and scraper 28 respectively. The drum 9 is heated by the burners 5 and maintained at such a temperature as to produce the desired rate of evaporation within the drum. The liquid is admitted to the drum through the pipe 20 under control of the valve 21.

As the operation starts the drum is empty and the product is gradually and continuously drawn in through the pipe 20 while it is distributed along the spreader 23 by the branches 22. The spreader prevents the influent, unconcentrated liquid from collecting in a pool in the bottom of the drum and immediately distributes the liquid uniformly upon the inner periphery of the drum so that the product passes directly upward over the top of the drum and then down to the scraper 28. During this step in the treatment, the product is retained in a thin layer or film and rapid evaporation takes place without objectionable swelling or foaming. As the next step, the partially concentrated liquid is continuously scraped from the periphery of the drum by the scraper 28 and flows obliquely inward and downward over the apron 29. This apron retains the product out of contact with the drum a sufficient period of time to allow for a slight cooling and further evaporation before delivering the product to the lower, central portion of the drum where, as the operation continues, a mass of relatively viscous, concentrated product collects. This mass tends to pass up the right periphery of the drum, as seen in Fig. 2, as rotation of the drum continues but the lower leg of the L-shaped spreader 23 confines the upwardly moving portion of the product to a thin layer which is immediately overlaid or covered with a film of the influent liquid issuing from the spreader and branch pipes 22. When a predetermined or desired quantity of the product has been concentrated, the heat is shut off, the machine is stopped and the vacuum broken. Finally the manhole 14 is opened and the product removed while hot and still in a fluid condition. It is preferably drawn off into containers of suitable size for handling and solidifies as it cools therein.

My process and machine are peculiarly adapted for use in concentrating products having a tendency to swell and foam when evaporated in a vacuum. A high vacuum of from twenty-six to twenty-eight inches of mercury is desirable during the concentration of molasses to avoid caramelization of the sugar, but such vacuum increases the difficulties due to swelling and foaming of such a product. If it is attempted to concentrate such products rapidly from a pool of substantial depth in a vacuum chamber the product is apt to foam and swell to such an extent that it is drawn out through the vacuum conduit with resulting waste, clogging of the apparatus and other difficulties which will be readily understood. I avoid such difficulties by preventing the collecting of the product in a mass in the drum until a large part of the moisture has been evaporated while the influent is retained in a thin film.

Molasses is of such character that if it were attempted to produce a solid product in the drum great difficulty would be experienced in removing the hard residue and such control of the temperature as would be required to avoid objectionable caramelization would also be difficult to obtain. By my improved method and apparatus I gradually accumulate a large liquid body or mass of the product in the bottom of the drum, but this mass is not allowed to extend above the spreader 23 or to such a height that the product can be drawn into the vacuum pipe 15. Evaporation of the moisture content is continued only to such point that the concentrated product is still fluid at the temperatures present in the vacuum chamber but solidifies upon cooling to normal exterior temperatures, such as those below about 100 degrees Fahrenheit.

Having described my invention, what I claim as new and desire to protect by Letters Patent is:

1. The method of concentrating molasses and like liquids which consists in spreading the liquid in a thin film on a heated moving surface, continuously removing said film from said surface, then collecting the resulting concentrated liquid in a mass, spreading said mass in a thin layer on said heated surface, covering said layer with a film of the unconcentrated liquid and continuing said removal and collecting until said mass has a concentration such that the product is liquid when hot and solid when cooled to normal temperatures.

2. The method of concentrating molasses and like liquids which consists in spreading the liquid in a thin film on a heated surface for an initial period of rapid evaporation, continuously removing said film from said surface and retaining the removed product out of contact with said surface for a brief interval of time, then collecting the partially concentrated product in a mass, spreading said mass in a layer on said heated surface and covering said layer with a film of fresh, unconcentrated liquid and continuing the evaporation until the desired concentration is obtained.

3. In a machine for concentrating molasses and like products, a drum mounted for rotation about its axis, means for heating the exterior of said drum, means for rotating said drum, means for creating a partial vacuum in said drum, a spreader extending adjacent to the periphery of said drum at one side, a scraper engaging the inner periphery of said drum at approximately the opposite side and an inlet pipe arranged to supply the liquid to be concentrated to the upper surface of said spreader.

4. In a machine for concentrating molasses and like products, a cylindrical drum mounted for rotation about its axis and with its axis disposed horizontally, means for heating the exterior of said drum, means for rotating said drum about its axis, means for creating a partial vacuum in said drum, a spreader extending parallel to the axis of said drum adjacent to the periphery thereof at one side, a scraper engaging the inner periphery of said drum at approximately the opposite side and means for supplying the liquid to be concentrated to the periphery of said drum above said spreader.

5. In a machine for concentrating molasses and like products, a drum mounted for rotation about its axis and with its axis substantially horizontal, said drum being arranged to collect a mass of the product in the bottom thereof, means for heating the exterior of said drum, means for rotating said drum, means for creating a partial vacuum in said drum, means including an inlet pipe adjacent to the periphery of said drum at one side for spreading the unconcentrated liquid directly on said drum above the surface of said mass of the product and means for removing the product from the inner periphery of said drum and for delivering the same to said mass.

6. A machine for concentrating molasses and like products comprising, a drum mounted with its axis substantially horizontal and arranged to be rotated about its axis, means for heating the exterior of said drum, means for creating a partial vacuum within said drum, means for rotating said drum about its axis and means for distributing the product to be concentrated within said drum comprising, a spreader extending adjacent to the periphery of said drum at one side, an inlet pipe for the product to be concentrated having discharge openings spaced along said spreader, means for adjusting the spacing of said spreader from the inner periphery of said drum and a scraper engaging the periphery of said drum for removing the concentrated product therefrom.

7. A machine for concentrating molasses and like liquids comprising, a cylindrical drum mounted with its axis substantially horizontal and arranged to be rotated about its axis, means for heating the exterior of said drum, means for creating a partial vacuum therein, means for rotating said drum about its axis and means for distributing and collecting the product within said drum comprising, an inlet pipe for the liquid to be concentrated, means for spreading the influent from said pipe directly along the periphery of said drum at one side, a scraper engaging the opposite periphery of said drum and means for collecting the liquid from said scraper in a mass in the lower central portion of said drum.

ALBERT C. HOUGLAND.